United States Patent [19]
Mullen, Jr.

[11] Patent Number: 5,872,335
[45] Date of Patent: Feb. 16, 1999

[54] 90 DEGREE SEALING NUT

[75] Inventor: Thomas M. Mullen, Jr., Dunellen, N.J.

[73] Assignee: Heyco Products, Inc., Kenilworth, N.J.

[21] Appl. No.: 885,536

[22] Filed: Jun. 30, 1997

Related U.S. Application Data

[60] Provisional application No. 60/038,371 filed Feb. 13, 1997.

[51] Int. Cl.$^6$ ....................................................... H02G 3/18
[52] U.S. Cl. ......................... 174/65 R; 248/74.1; 285/92; 439/466
[58] Field of Search .............................. 174/65 R, 65 SS, 174/65 G, 152 G, 135, 153 R, 93; 285/92, 139.2, 126.1, 179.1, 272.1, 161; 439/466, 467, 473; 248/74.1, 74.2, 56; D13/154, 156; D8/315

[56] References Cited

U.S. PATENT DOCUMENTS

| | | | |
|---|---|---|---|
| 2,664,458 | 12/1953 | Rapata | 174/153 G |
| 2,967,722 | 1/1961 | Lifka . | |
| 3,809,798 | 5/1974 | Simon . | |
| 4,224,464 | 9/1980 | Bunnell et al. | 174/65 R |
| 4,487,386 | 12/1984 | Hehl . | |
| 4,490,576 | 12/1984 | Bolante et al. | 174/65 SS |
| 4,692,562 | 9/1987 | Nattel | 174/65 SS |
| 4,698,459 | 10/1987 | Drake . | |
| 4,739,126 | 4/1988 | Gutter et al. | 174/65 SS |
| 4,874,325 | 10/1989 | Bensing et al. | 439/272 |
| 4,888,453 | 12/1989 | Blasko . | |
| 5,072,072 | 12/1991 | Bawa et al. | 174/65 SS |
| 5,098,310 | 3/1992 | Avramovich et al. | 439/282 |
| 5,200,575 | 4/1993 | Sheehan | 174/65 R |
| 5,226,837 | 7/1993 | Cinibulk et al. | 439/521 |
| 5,304,742 | 4/1994 | Filbert . | |
| 5,318,459 | 6/1994 | Shields | 439/527 |
| 5,321,205 | 6/1994 | Bawa et al. . | |
| 5,405,172 | 4/1995 | Mullen, Jr. . | |
| 5,563,378 | 10/1996 | Uchida et al. . | |

FOREIGN PATENT DOCUMENTS

| | | | |
|---|---|---|---|
| 0151272 | 12/1984 | European Pat. Off. . | |
| 0151273 | 12/1984 | European Pat. Off. . | |
| 0283575 | 12/1987 | European Pat. Off. . | |
| 2219146 | 11/1989 | United Kingdom | 174/65 SS |
| 2258350 | 3/1993 | United Kingdom | 174/65 SS |

*Primary Examiner*—Bot Ledynh
*Assistant Examiner*—Dhiru R. Patel
*Attorney, Agent, or Firm*—Selitto & Associates

[57] ABSTRACT

A sealing nut adapted for use in connection with a liquid-tight connector, which is mountable on a housing of an electrical or mechanical device and which includes a grasping portion adjacent an end thereof projecting outwardly from the housing, is disclosed. More particularly, the sealing nut includes a base having a passageway extending therethrough along a longitudinal axis of the base and being sized and shaped to removably receive the grasping portion of the connector. The sealing nut also includes a cover pivotally connected to the base such that the cover is movable between an open position, in which the cover exposes the passageway of the base to an extent sufficient to allow a cable to be fed through the sealing nut in a substantially straight line running generally parallel to the longitudinal axis of the base, and a closed position, in which the cover overlies the passageway in the base such that the cover loosely guides the cable to form a bend therein. A retaining mechanism is provided for retaining the cover in its closed position. A cooperating mechanism is also provided for cooperating with the grasping portion of the connector so as to grasp an adjacent portion of the cable in a liquid-tight and strain-relieving manner. The cooperating mechanism is located within the base, whereby the liquid-tight and strain-relieving functions performed thereby are not compromised during use even if the cover is inadvertently moved from its closed position.

54 Claims, 9 Drawing Sheets

90 DEGREE SEALING NUT

CROSS REFERENCE TO RELATED APPLICATION

This is a §111(a) application relating to U.S. application Ser. No. 60/038,371 filed Feb. 13, 1997.

FIELD OF THE INVENTION

The present invention relates to a liquid-tight fitting, and, more particularly, to a liquid-tight fitting equipped with a 90° sealing nut.

BACKGROUND OF THE INVENTION

In the past, various devices have been developed for feeding a wire, cable, tube or the like to an electrical and/or mechanical device at an angle such as 90° (see, for instance, European Patent No. 0 283 575 B1, European Patent No. 0 151 273 B1 and the HSK strain relief snap elbow marketed by Hummel GmbH). Some of these devices are equipped with bases and covers pivotally connected to the bases for orienting associated cables at an angle, as well as clamping mechanisms for providing sealing and/or strain relief. However, it is believed that if the covers of such devices are accidentally opened during use, the sealing and/or strain relief functions provided by the clamping mechanisms are compromised. Accordingly, there is a need for a device which is adapted to maintain the integrity of the sealing and/or strain relief functions provided thereby, even if its cover is accidentally or otherwise opened during use.

SUMMARY OF THE INVENTION

The present invention overcomes the disadvantages and shortcomings of the prior art discussed above by providing a new and improved sealing nut adapted for use in connection with a liquid-tight connector which is mountable on a housing of an electrical or mechanical device and which includes a grasping portion adjacent an end thereof projecting outwardly from the housing. More particularly, the sealing nut includes a base having a passageway extending therethrough along a longitudinal axis of the base and being sized and shaped so as to removably receive the grasping portion of the connector. The sealing nut also includes a cover pivotally connected to the base such that the cover is movable between an open position, in which the cover exposes the passageway of the base to an extent sufficient to allow a cable to be fed through the sealing nut in a substantially straight line running generally parallel to the longitudinal axis of the base, and a closed position, in which the cover overlies the passageway in the base such that the cover loosely guides the cable to form a bend therein. A retaining mechanism is provided for retaining the cover in its closed position. A cooperating mechanism is also provided for cooperating with the grasping portion of the connector so as to grasp an adjacent portion of the cable in a liquid-tight and strain-relieving manner. The cooperating mechanism is located within the base, whereby the liquid-tight and strain-relieving functions performed thereby are not compromised during use even if the cover is inadvertently moved from its closed position.

BRIEF DESCRIPTION OF THE DRAWINGS

For a more complete understanding of the present invention, reference is made to the following detailed description of various exemplary embodiments considered in conjunction with the accompanying drawings, in which.

DETAILED DESCRIPTION OF THE EXEMPLARY EMBODIMENTS

Figure 1:
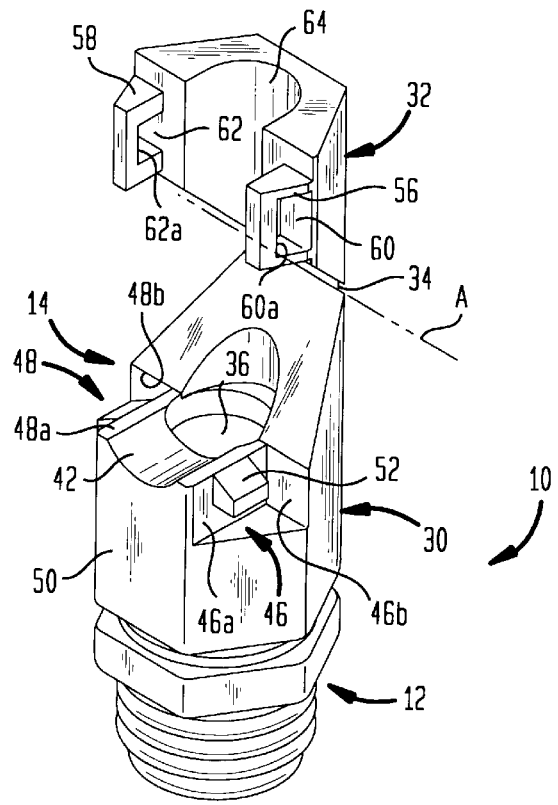
FIG. 1 is a perspective view of a liquid-tight fitting which is equipped with a 90° sealing nut constructed in accordance with a first embodiment of the present invention, the sealing nut being shown in its open position.
Figure 2:
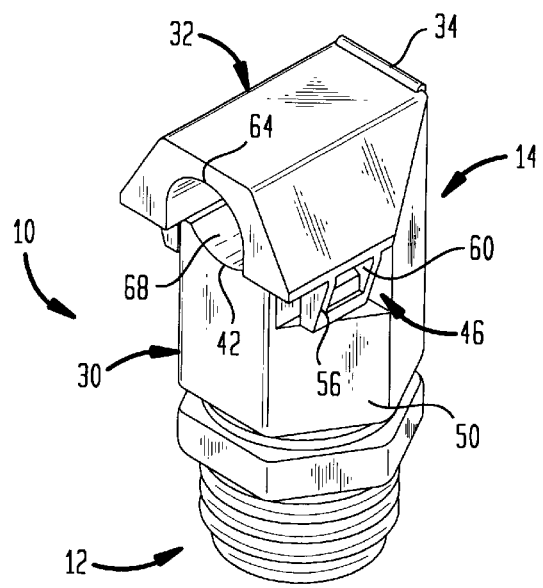
FIG. 2 is a view similar to FIG. 1, except that the sealing nut is in its closed position.
Figure 3:
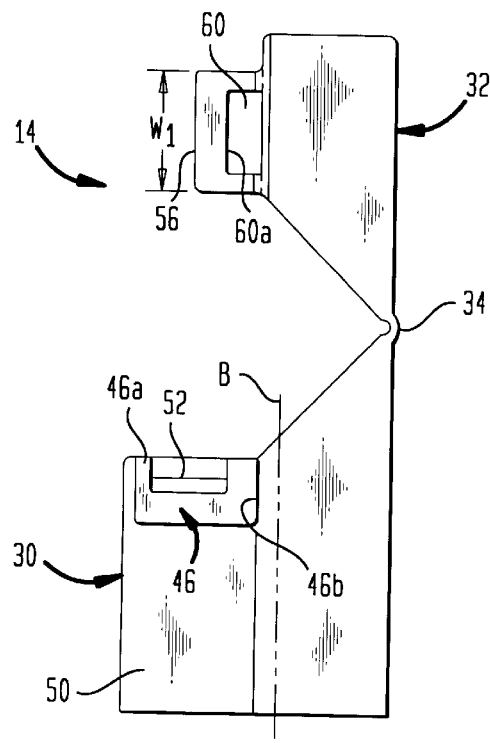
FIG. 3 is a side elevational view of the sealing nut illustrated in FIG. 1.
Figure 4:
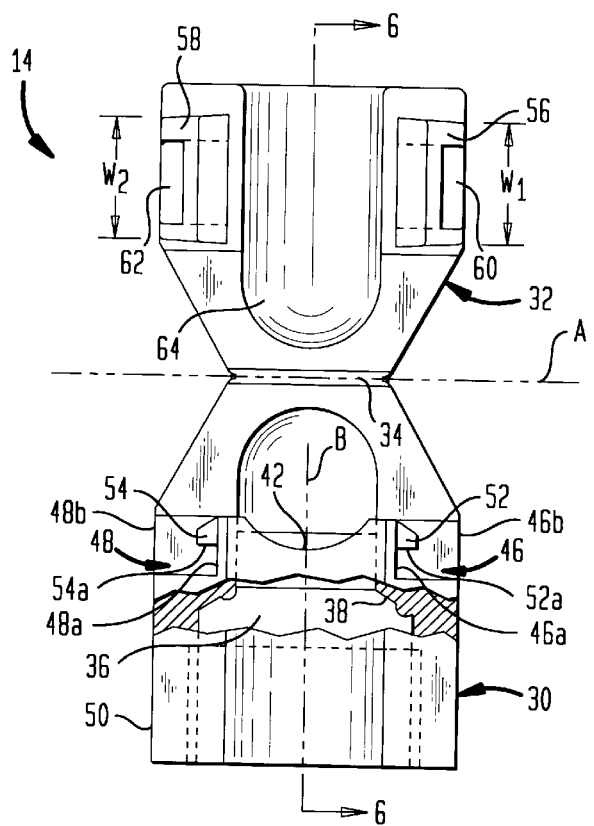
FIG. 4 is a partially cutaway, front elevational view of the sealing nut illustrated in FIGS. 1 and 3.
Figure 5:
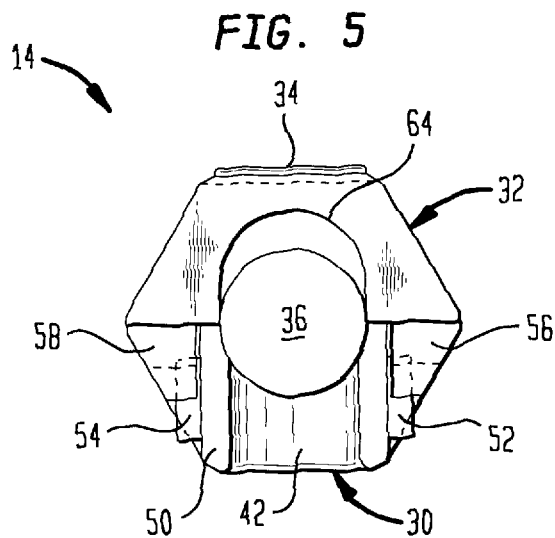
FIG. 5 is a top plan view of the sealing nut illustrated in FIGS. 1, 3 and 4.
Figure 6:
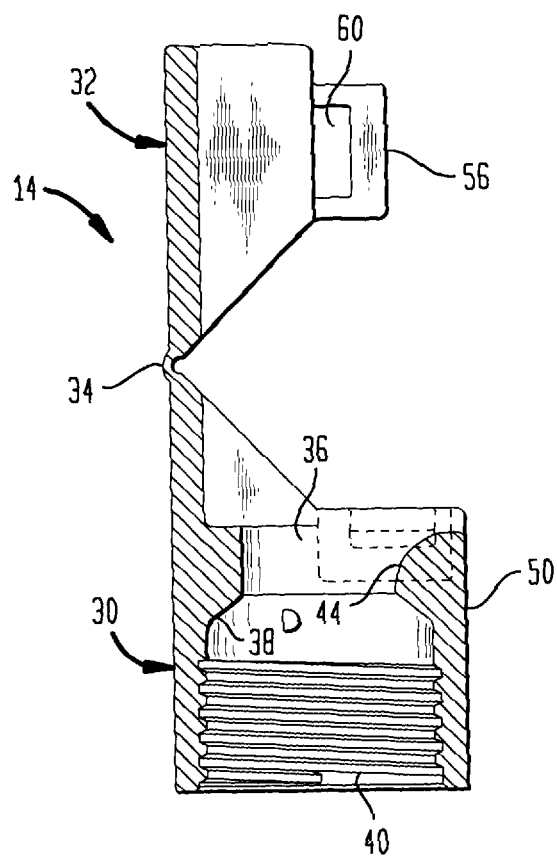
FIG. 6 is a cross-sectional view, taken along section line 6—6 and looking in the direction of the arrows, of the sealing nut illustrated in FIG. 4.
Figure 7:
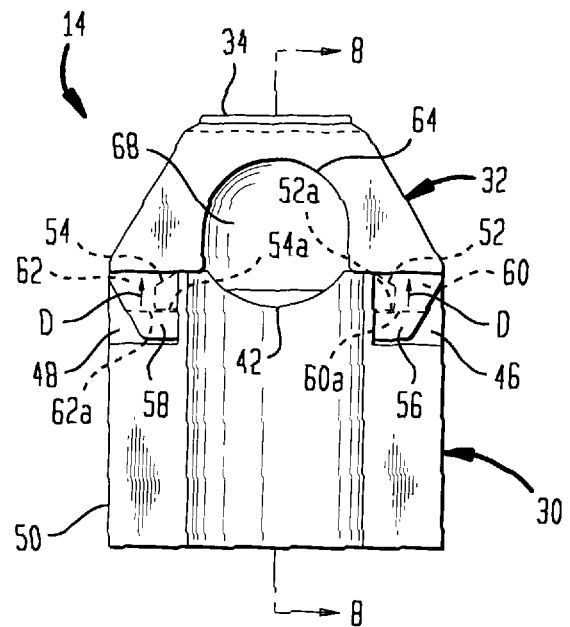
FIG. 7 is a front elevational view of the sealing nut illustrated in FIG. 2.
Figure 8:
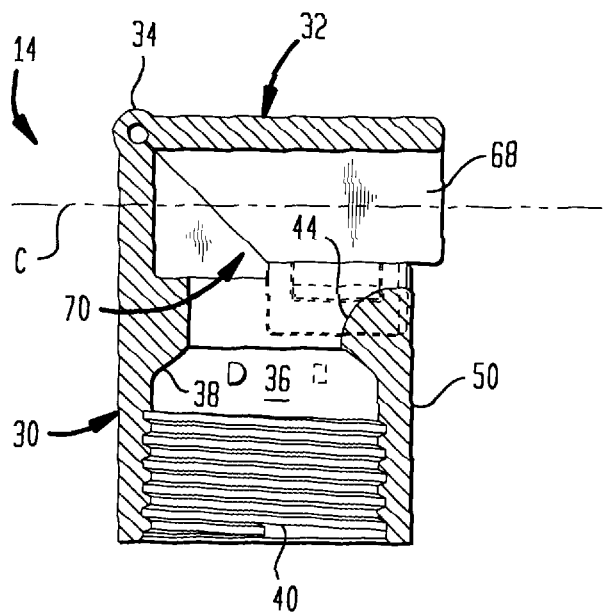
FIG. 8 is a cross-sectional view, taken along section line 8—8 and looking in the direction of the arrows, of the sealing nut illustrated in FIG. 7.

FIG. 1 shows a liquid-tight fitting 10 having a liquid-tight body (i.e., connector) 12 and a 90° sealing nut 14, which is constructed in accordance with a first embodiment of the present invention and which is adapted for use in connection with the body 12. The construction and operation of the body 12 are identical to those of the body of the liquidtight connector disclosed in U.S. Pat. No. 5,405,172, the specification of which is incorporated herein by reference. For instance, referring to FIG. 9A, the body 12 has an upper portion (i.e., a grasping portion) 16 provided with strain relief fingers 18, a gland 20, which is cradled by the strain relief fingers 18, and threads 22 for coupling the body 12 to the sealing nut 14. The body 12 also has a threaded lower portion 24 for mounting the body 12 on a housing 26 of an electrical and/or mechanical device in a liquid-tight fashion. More particularly, a lock nut 28 is threaded onto the lower portion 24 so as to mount the body 12 on the housing 26. In order to achieve the desired liquid-tight seal between the body 12 and the housing 26, a raised circular ridge 29a is provided on an hexagonal flange 29b of the body 12, the ridge 29a being adapted to come into sealing engagement with the housing 26 when the lock nut 28 is completely threaded onto the lower portion 24 of the body 12. Alternatively, the lower portion 24 can be tapered such that it can be threaded directly into a similarly tapered threaded hole (not shown) formed in the housing 26 of the device, whereby a liquid-tight engagement is formed directly between the lower portion 24 and the hole.

With reference to FIGS. 1–8, the sealing nut 14, which is preferably made from injection grade nylon by an injection molding process, has a base 30, a cover 32 and a living hinge 34, which pivotally connects the cover 32 to the base 30 so as to allow the cover 32 to pivot about a pivot axis A (see FIGS. 1 and 4) and which is integrally formed with the base 30 and the cover 32. The base 30 is adapted to be coupled to the upper portion 16 of the body 12 in a threaded manner and to cooperate with the strain relief fingers 18 and the gland 20 of the body 12 in grasping a cable 33 extending through the liquid-tight fitting 10 in a manner similar to the one described in the '172 Patent (see FIGS. 9B and 9C). In this regard, the base 30 has a longitudinal passageway 36, which extends through the base 30 along a longitudinal axis B thereof (see FIGS. 3 and 4) for feeding the cable 33 therethrough and which is sized and shaped so as to removably receive the upper portion 16 of the body 12, a conical internal surface 38 (see FIG. 4), which is adapted to compress the fingers 18 and the gland 20, and threads 40 (see FIGS. 6 and 8) for coupling the base 30 to the body 12. In addition, the base 30 has an open trough 42 positioned adjacent an upper end of the base 30 and having a smooth arcuate rear surface 44 (see FIGS. 6 and 8) for purposes to be discussed hereinafter. Moreover, the base 30 is equipped with a pair of cavities 46, 48 formed in an exterior wall 50 of the body 12 on opposite sides thereof. The cavities 46, 48 include transverse planar walls 46a, 48a, respectively, which are substantially normal to the pivot axis A, and parallel planar walls 46b, 48b, respectively, which are substantially parallel to the pivot axis A (see FIGS. 1, 3 and 4). Locking tabs 52, 54 are formed and located in the cavities 46, 48, respectively, and extend laterally from the walls 46a, 48a, respectively, of the cavities 46, 48, respectively, of the base 30 in opposite directions. The locking tabs 52, 54 are oriented transversely with respect to the longitudinal axis B of the base 30 for purposes to be discussed hereinafter. That is, the locking tabs 52, 54 include planar locking surfaces 52a, 54a (see FIG. 4), respectively, lying in a plane which is substantially normal to the longitudinal axis B of the base 30. The base 30 also has a hexagonal shape for facilitating the threading of the sealing nut 14 to the body 12 by using a conventional tool such as a wrench (not shown).

Still referring to FIGS. 1–7, the cover 32 is pivotable about the pivot axis A, which extends substantially transverse to the longitudinal axis B of the base 30, between an open position, in which the cover 32 exposes the passageway 36 of the base 30 to an extent sufficient to allow the cable 33 to be fed through the sealing nut 14 in a substantially straight line running generally parallel to the longitudinal axis B of the base 30 (see FIGS. 1, 3–6, 9A and 9B), and a closed position, in which the cover 32 overlies the passageway 36 in the base 30 such that the cover 32 loosely guides the cable 33 to form a bend therein (see FIGS. 2, 7, 8 and 9C). The cover 32 also includes a locking finger 56 depending from one side of the cover 32 and a locking finger 58 depending from an opposite side of the cover 32. Slots 60, 62 are formed in the locking fingers 56, 58, respectively, for coupling the cover 32 to the base 30 in a snap-fit fashion. More particularly, the slots 60, 62 are sized and shaped so as to receive the locking tabs 52, 54, respectively, of the base 30 in a snap-fit fashion when the cover 32 is pivoted towards and pressed against the base 30 (i.e., when the cover 32 is in its closed position). In this regard, the slots 60, 62 include planar locking surfaces 60a, 62a (see FIGS. 1 and 3), respectively, which engage the locking surfaces 52a, 54a, respectively, when the locking tabs 52, 54 engage the locking fingers 56, 58, respectively, thereby maintaining (i.e., retaining) the cover 32 in its closed position (see FIG. 7). In addition, the slots 60, 62 extend completely through interior portions of the locking fingers, 56, 58, respectively, such that the locking fingers 56, 58 surround the locking tabs 52, 54 when the cover 32 is in its closed position (see FIG. 7). Further, when the cover 32 is in its closed position, the slots 60, 62 are so oriented that the locking surfaces 60a, 62a lie in a plane which is substantially normal to the longitudinal axis B of the base 30. The locking fingers 56, 58 also have widths $W_1$, $W_2$ (see FIGS. 3 and 4), respectively, extending in directions which are substantially parallel to the walls 46a, 48a, respectively, of the cavities 46, 48, respectively, when the locking tabs 52, 54 and the locking fingers 56, 58 are engaged (see FIGS. 7 and 8). Moreover, an open trough 64 extends from one end of the cover 32 to an opposite end of the cover 32. The trough 64 is sized and shaped so as to cooperate with the trough 42 of the base 30 to form a lateral passageway 68 communicating with the longitudinal passageway 36 of the base 30 (see FIGS. 2, 7 and 8) and having a longitudinal axis C (see FIG. 8) oriented at a 90° angle relative to the longitudinal axis B of the base 30 when the cover 32 is coupled to the base 30.

Figure 9A:
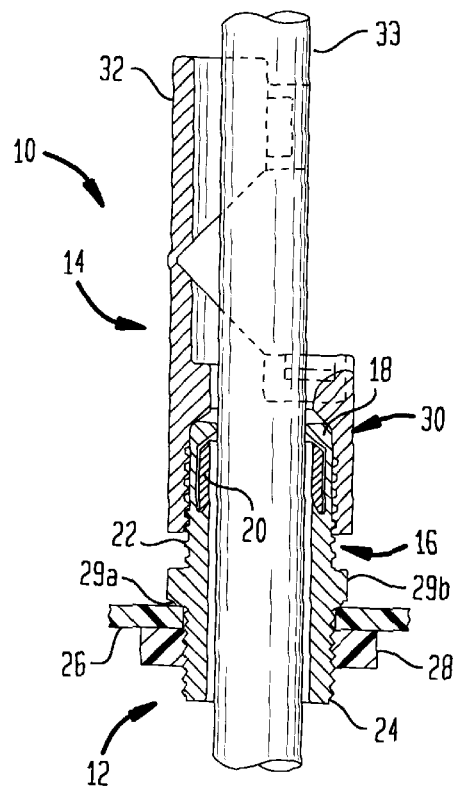
FIGS. 9A–9C are schematic views of the liquid-tight fitting illustrated in FIGS. 1 and 2, showing it in use.
Figure 9B:
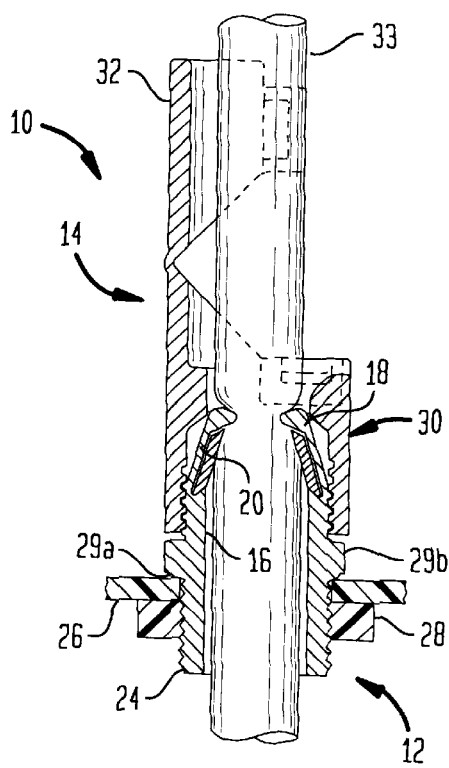
Figure 9C:
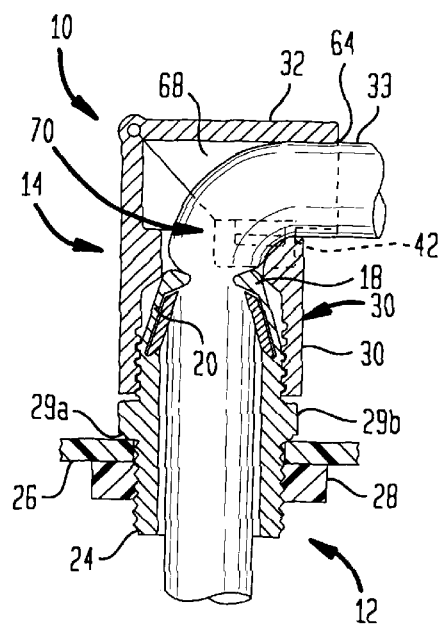
Figure 10:
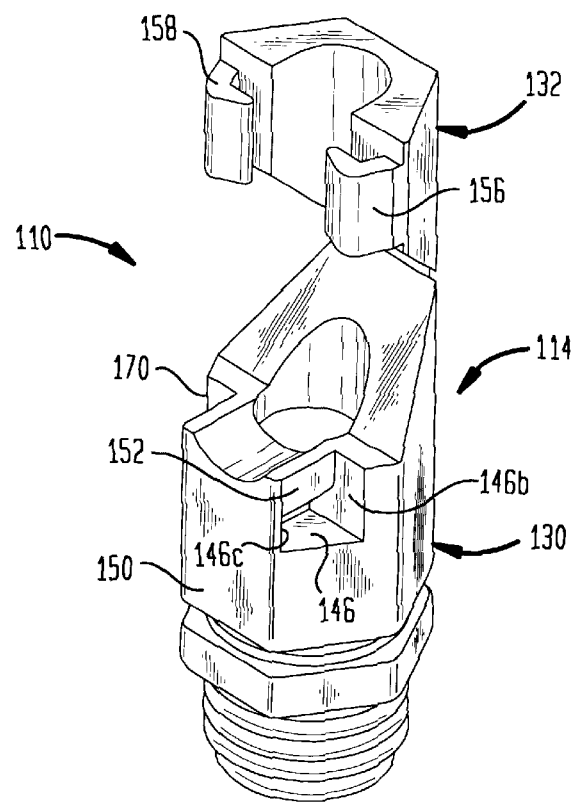
FIG. 10 is a perspective view of a liquid-tight fitting which is equipped with a 90° sealing nut constructed in accordance with a second embodiment of the present invention, the sealing nut being shown in its open position.
Figure 11:
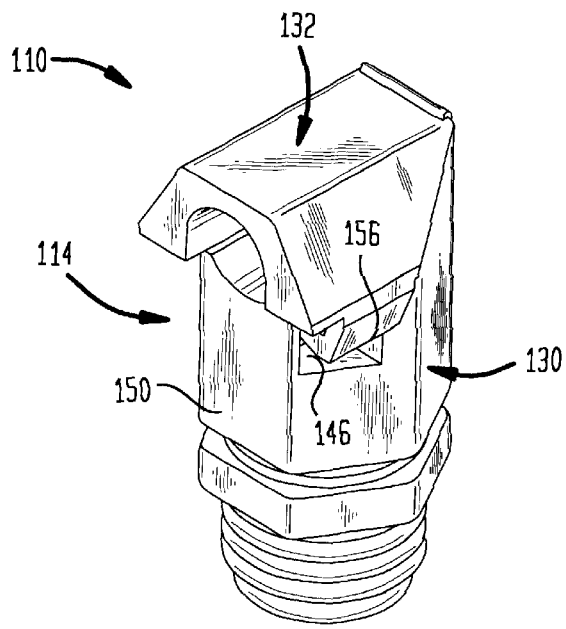
FIG. 11 is a view similar to FIG. 10, except that the sealing nut is in its closed position.
Figure 12:
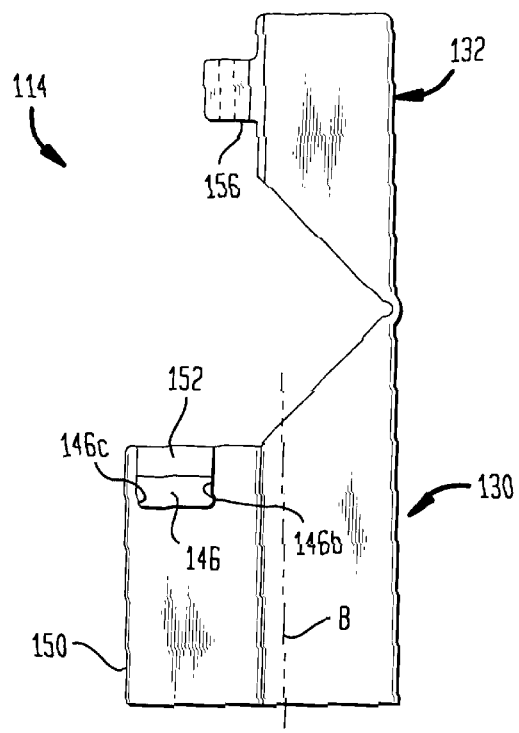
FIG. 12 is a side elevational view of the sealing nut illustrated in FIG. 10.
Figure 13:
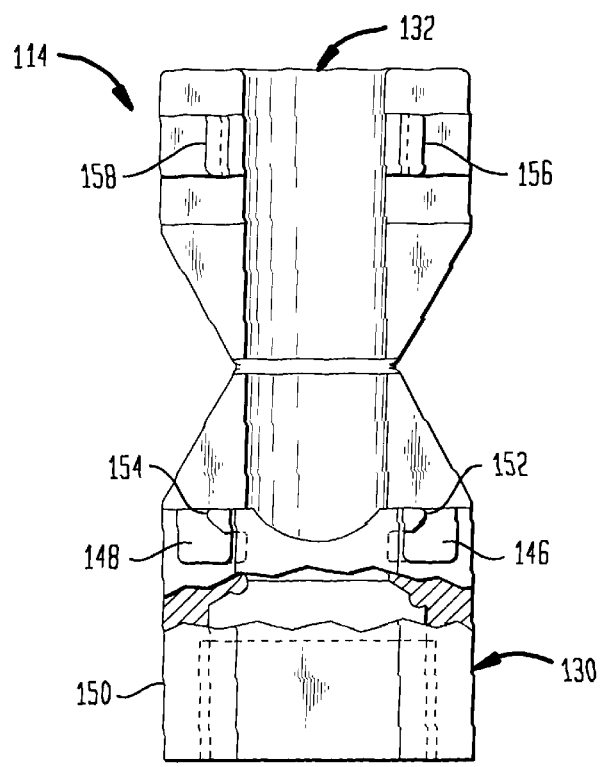
FIG. 13 is a partial cutaway, front elevational view of the sealing nut illustrated in FIGS. 10 and 12.
Figure 14:
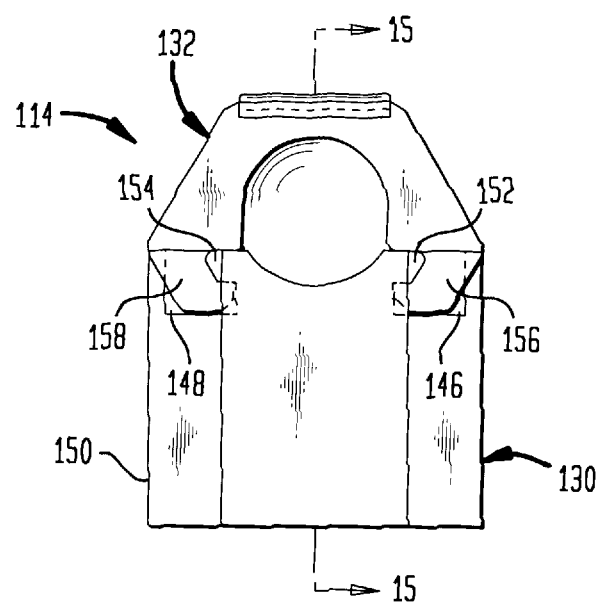
FIG. 14 is a front elevational view of the sealing nut illustrated in FIG. 11.
Figure 15:
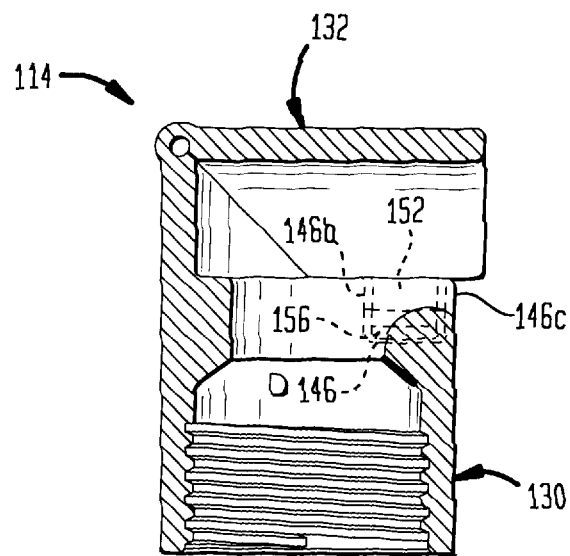
FIG. 15 is a cross-sectional view, taken along section line 15—15 and looking in the direction of the arrows, of the sealing nut illustrated in FIG. 14.

With reference to FIGS. 9A–9C, to use the liquid-tight fitting 10, the body 12 is mounted on the housing 26 of the electrical and/or mechanical device by threading the lock nut 28 to the lower portion 24 of the body 12 or by directly threading the lower portion 24 into a threaded opening formed in the housing 26. With the cover 32 oriented in its open position, the sealing nut 14 is loosely coupled to the upper portion 16 of the body 12 in a threaded manner. The cable 33 is then fed to the device through the longitudinal passageway 36 of the base 30 and the body 12 in a straight line (see FIG. 9A). Alternatively, the body 12, the sealing nut 14 and the cable 33 can be preassembled in the manner described above and then mounted on the housing 26 of the device. Next, the sealing nut 14 is fully threaded to the upper portion 16 of the body 12 such that the base 30 of the sealing nut 14 cooperates with the strain relief fingers 18 and the gland 20 of the body 12 to grasp the cable 33 in a liquid-tight manner (see FIG. 9B), while also providing strain relief. After the liquid-tight fitting 10 is rotated to a position which directs the cable 33 towards its desired destination outside the housing 26, the cover 32 is snap-fitted to the base 30. More particularly, the locking tabs 52, 54 of the base 30 are snap-fitted into the slots 60, 62, respectively, of the locking fingers 56, 58, respectively (see FIGS. 7 and 9C), thereby orienting the cover 32 in its closed position. In the foregoing manner, the cable 33 is captured between the troughs 42, 64 of the base 30 and cover 32, respectively, and is thus positioned in the lateral passageway 68. As a result, the cable 33 is caused to form a 90° bend adjacent a junction 70 (see FIGS. 8 and 9C) formed between the passageway 36 of the base 30 and the lateral passageway 68 and is thereby fed to the electrical and/or mechanical device at a 90° angle.

It should be appreciated that the present invention provides numerous advantages over the prior art. For instance, because the cover 32 pivots away from the base 30 to expose the longitudinal passageway 36, it allows the cable 33 to be fed to the housing 26 through the liquid-tight fitting 10 in a straight line. In this manner, the sealing nut 14 makes the feeding of the cable 33 to the housing 26 both simple and efficient. Moreover, because the cable 33 is grasped by the body 12 at the base 30 in a sealing and strain-relieving manner, even if the cover 32 is accidentally or otherwise opened during the use of the sealing nut 14, the sealing and strain-relieving functions performed by the body 12 and the sealing nut 14 are not compromised. In addition, due to its curved smooth shape, the arcuate surface 44, which is formed adjacent the junction 70, facilitates the bending of the cable 33 thereabout when the cover 32 is moved from its open position to its closed position and functions to minimize damage to the cable 33 (e.g., in the form of cuts caused by sharp edges and the like) during the bending of the cable 33 and/or the usage of the liquid-tight fitting 10.

The locking mechanism of the present invention also provides further advantages over the prior art. For instance, because the locking tabs 52, 54 are oriented transversely relative to the longitudinal axis B of the base 30, the locking tabs 52, 54 and the locking fingers 56, 58 come to engage each other in a vertical direction. That is, the locking surfaces 60a, 62a of the locking fingers 56, 58, respectively, lie in a plane which is normal to the longitudinal axis B of the base 30, when the locking fingers 56, 58 engage the locking tabs 52, 54, respectively. As a result, any reaction force in the locking fingers 56, 58 in response to external forces acting upon the sealing nut 14 tends to be in a direction substantially parallel to the longitudinal axis B (as indicated by vertically directed arrows D in FIG. 7). In such circumstances, the locking fingers 56, 58 and the locking tabs 52, 54 provide enhanced resistance to their disengagement and hence enhanced resistance to accidental disengagement of the cover 32 from the base 30. Further, because the locking fingers 56, 58 completely surround the locking tabs 52, 54, respectively, the locking fingers 56, 58 are inhibited from sliding laterally relative to the locking tabs 52, 54, respectively, when external force is applied to the cover 32, thereby further enhancing resistance to disengagement. Moreover, because the locking fingers 56, 58 completely surround the locking tabs 52, 54, the interlocking engagement between the locking fingers 56, 58 and the locking tabs 52, 54, respectively, is maintained, even if the hinge 34 is cracked or otherwise broken during the use of the sealing nut 14. In this manner, the cover 32 is adapted to remain coupled to the base 30 and to thereby maintain the 90° angular orientation of the cable 33 even without the benefit of the structural support normally provided by the hinge 34.

The cover 32 also provides additional advantages over the prior art. For instance, the trough 64 provides the cover 32 with a spring-like characteristic. As a result, the cover 32 flexes as the locking fingers 56, 58 interlock with the locking tabs 52, 54, respectively, and assumes its normal shape after the locking fingers 56, 58 have fully engaged with the locking tabs 52, 54, respectively. In this manner, the cover 32 facilitates the snap-fit engagement between the locking fingers 56, 58 and the locking tabs 52, 54, respectively. Moreover, the trough 64 facilitates the removal of an associated core from the sealing nut 14 after the molding of same and therefore facilitates the molding process.

It should be noted that the present invention can have numerous modifications and variations. For instance, the orientation of the lateral passageway 68 relative to the longitudinal passageway 36 of the body 12 can be modified to assume other angles (e.g., 100°). In addition, the base 30 can have a shape other than a hexagonal shape. Moreover, the living hinge 34 can be replaced with any other conventional hinge mechanism. The locking fingers 56, 58 and the locking tabs 52, 54 can also be replaced with any conventional locking mechanism. Further, the sealing nut 14 can be made from other suitable materials and/or by other conventional processes.

FIGS. 10–15 and FIG. 16 and 17 depict second and third embodiments, respectively, of the present invention. Elements illustrated in FIGS. 10–15 and FIG. 16 and 17 which correspond, either identically or substantially, to the elements described above with respect to the embodiment of FIGS. 1–9C have been designated by corresponding reference numerals increased by one hundred and two hundred, respectively. Unless otherwise stated, the embodiments of FIGS. 10–17 are constructed, assembled and used in the same basic manner as the embodiment of FIGS. 1–9C.

FIGS. 10–15 illustrate a liquid-tight fitting 110 which is equipped with a 90° sealing nut 114 constructed in accordance with a second embodiment of the present invention. The construction, operation and usage of the sealing nut 114 are identical to those of the sealing nut 14 of the embodiment shown in FIGS. 1–9C, except as follows. The sealing nut 114 has a base 130 provided with a pair of cavities 146, 148 which are formed in an exterior wall 150 of the base 130 on opposing sides thereof. Locking tabs 152, 154 are formed in the cavities 146, 148, respectively, and extend laterally from the base 130 in opposite directions. Like the locking tabs 52, 54 of the embodiment of FIGS. 1–9C, the locking tabs 152, 154 are oriented transversely with respect to the longitudinal axis B of the base 130. The sealing nut 114 also has a cover 132 equipped with a pair of locking fingers 156, 158 depending from the cover 132 on opposite sides thereof. The locking fingers 156, 158 are sized and shaped so as to interlock with the locking tabs 152, 154, respectively, of the base 130 and to thereby couple the cover 132 to the base 130 in a snap-fit fashion (see FIGS. 11, 14 and 15). Each of the cavities, 146, 148 also includes side planar walls 146b, 146c for capturing a corresponding one of the locking fingers 156, 158 therebetween (see FIGS. 10, 12 and 15). In this manner, the locking fingers 156,158 are inhibited from moving laterally relative to the locking tabs 152, 154, respectively, thereby providing enhanced resistance to accidental disengagement of the cover 132 from the base 130. Moreover, because the locking tabs 152, 154 are oriented transversely relative to the longitudinal axis B of the base 130, the locking tabs 152, 154 and the locking fingers 156, 158 come to engage each other in a vertical direction. In such circumstances, the locking tabs 152, 154 and the locking fingers 156, 158 further enhance resistance to accidental disengagement of the cover 132 from the base 130.

Figure 16:
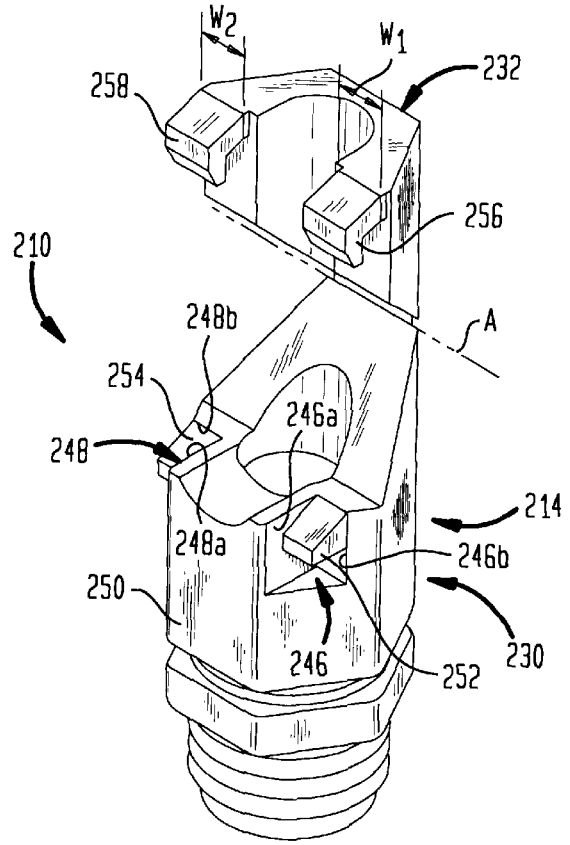
FIG. 16 is a perspective view of a liquid-tight fitting which is equipped with a 90° sealing nut constructed in accordance with a third embodiment of the present invention, the sealing nut being shown in it open position.
Figure 17:
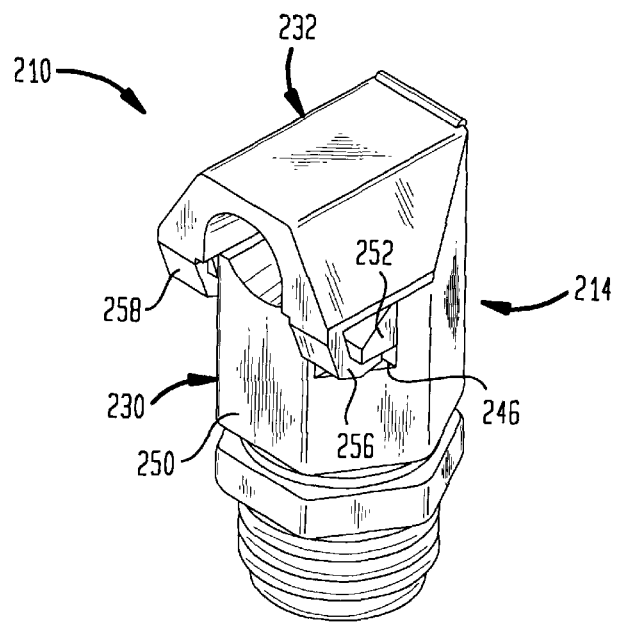
FIG. 17 is a view similar to FIG. 16, except that the sealing nut is in its closed position.

FIGS. 16 and 17 illustrate a liquid-tight fitting 210 which is equipped with a 90° sealing nut 214 constructed in accordance with a third embodiment of the present invention. The construction, operation and usage of the sealing nut 214 are identical to those of the sealing nut 14 of the embodiment shown in FIGS. 1–9C, except as follows. The sealing nut 214 has a base 230 and a cover 232 pivotable about a pivot axis A. More particularly, the base 230 is provided with a pair of cavities 246, 248 which are formed in an exterior wall 250 of the base 230 on opposite sides thereof. The cavities 246, 248 include transverse planar walls 246a, 248a, respectively, which are substantially normal to the pivot axis A, and parallel planar walls 246b, 248b, respectively, which are substantially parallel to the pivot axis A. Locking tabs 252, 254 are formed and located in the cavities 246, 248, respectively, and extend forwardly from the base 230 (i.e., they project from the walls 246b, 248b, respectively, of the cavities 246, 248, respectively). The cover 232 is equipped with a pair of locking fingers 256, 258 depending from the cover 232. The locking fingers 256, 258 are sized and shaped so as to interlock with the locking tabs 252, 254, respectively, of the base 230 and to thereby couple the cover 232 to the base 230 in a snap-fit fashion. The locking fingers 256, 258 have widths $W_1$, $W_2$, respectively, extending in a direction which is substantially parallel to the walls 246b, 248b, respectively, of the cavities 246, 248, respectively, when the locking fingers 256, 258 engage the locking tabs 252, 254, respectively.

It will be understood that the embodiments described herein are merely exemplary and that a person skilled in the art may make many variations and modifications without departing from the spirit and scope of the invention. All such variations and modifications are intended to be included within the scope of the invention as defined by the appended claims.

I claim:

1. A sealing nut adapted for use in connection with a liquid-tight connector which is mountable on a housing of an electrical or mechanical device and which includes a grasping portion adjacent an end thereof projecting outwardly from the housing, said sealing nut comprising: a base having a passageway extending therethrough along a longitudinal axis of said base, said passageway being sized and shaped so as to removably receive the grasping portion of the connector; a cover pivotally connected to said base such that said cover is movable between an open position, in which said cover exposes said passageway of said base to an extent sufficient to allow a cable to be fed through the sealing nut in a substantially straight line running generally parallel to said longitudinal axis of said base, and a closed position, in which said cover overlies said passageway in said base such that said cover loosely guides the cable to form a bend therein; retaining means for retaining said cover in its said closed position; and cooperating means for cooperating with the grasping portion of the connector so as to grasp an adjacent portion of the cable in a liquid-tight and strain-relieving manner, said cooperating means being located within said base, whereby the liquid-tight and strain-relieving functions performed thereby are not compromised during use even if said cover is inadvertently moved from its said closed position.

2. The sealing nut of claim 1, wherein said retaining means includes at least one locking member formed on said base and at least another locking member formed on said cover, said at least another locking member engaging said at least one locking member when said cover is in its said closed position.

3. The sealing nut of claim 2, wherein said at least one locking member includes at least one planar locking surface and said at least another locking member includes at least another planar locking surface, said at least one locking surface being in direct engagement with said another locking surface when said at least another locking member engages said at least one locking member, thereby retaining said cover in its said closed position.

4. The sealing nut of claim 3, wherein said at least one locking surface lies in a plane which is substantially normal to said longitudinal axis of said base.

5. The sealing nut of claim 4, wherein said at least another locking surface lies in said plane when said at least another locking member engages said at least one locking member, thereby enhancing resistance to the disengagement of said at least another locking member from said at least one locking member.

6. The sealing nut of claim 5, wherein said at least one locking member includes a first locking member and a second locking member formed on said base; and wherein said at least another locking member includes a third locking member and a fourth locking member formed on said cover, said third locking member and said fourth locking member engaging said first locking member and said second locking member, respectively, when said cover is in its said closed position.

7. The sealing nut of claim 6, wherein said first locking member and said second locking member include a first planar locking surface and a second planar locking surface, respectively; and wherein said third locking member and said fourth locking member include a third planar locking surface and a fourth planar locking surface, respectively, said first locking surface and said second locking surface being in direct engagement with said third locking surface and said fourth locking surface, respectively, when said third locking member and said fourth locking member engage said first locking member and said second locking member, respectively, thereby retaining said cover in its said closed position.

8. The sealing nut of claim 7, wherein said first locking surface of said first locking member and said second locking surface of said second locking member lie in said plane; and wherein said third locking surface of said third locking member and said fourth locking surface of said fourth locking member lie in said plane when said third locking member and said fourth locking member engage said first locking member and said second locking member, respectively, thereby enhancing resistance to the disengagement of said third locking member and said fourth locking member from said first locking member and said second locking member, respectively.

9. The sealing nut of claim 8, wherein said cover is pivotable about a pivot axis which extends substantially transverse to said longitudinal axis of said base.

10. The sealing nut of claim 9, wherein said base is pivotally connected to said cover by a living hinge.

11. The sealing nut of claim 10, wherein said base has a first cavity in one side thereof and a second cavity in an opposite side thereof, said first locking member and said second locking member being located in said first cavity and said second cavity, respectively; and wherein said third locking member depends from one side of said cover and said fourth locking member depends from an opposite side of said cover.

12. The sealing nut of claim 11, wherein said first and second locking members engage said third and fourth locking members, respectively, in a snap-fit fashion.

13. The sealing nut of claim 12, wherein each of said first and second cavities has a first planar wall which is substantially normal to said pivot axis and a second planar wall which is substantially parallel to said pivot axis.

14. The sealing nut of claim 13, wherein said third locking member extends widthwise in a direction which is substantially parallel to said first wall of said first cavity when said first and third locking members are engaged; and wherein said fourth locking member extends widthwise in a direction which is substantially parallel to said first wall of said second cavity when said second and fourth locking members are engaged.

15. The sealing nut of claim 14, wherein said first locking member includes a first tab which extends from said first wall of said first cavity; and wherein said second locking member includes a second tab which extends from said first wall of said second cavity.

16. The sealing nut of claim 15, wherein said third locking member includes a first slot sized and shaped so as to receive said first tab when said cover is in its said closed position; and wherein said fourth locking member includes a second slot sized and shaped so as to receive said second tab when said cover is in its said closed position.

17. The sealing nut of claim 16, wherein said first slot extends completely through an interior portion of said third locking member such that said third locking member surrounds said first tab when said cover is in its said closed position, whereby said first and third locking members will remain engaged even if said living hinge breaks; and wherein said second slot extends completely through an interior portion of said fourth locking member such that said fourth locking member surrounds said second tab when said cover is in its said closed position, whereby said second and fourth locking members will remain engaged even if said living hinge breaks.

18. The sealing nut of claim 13, wherein said third locking member extends widthwise in a direction which is substantially parallel to said second wall of said first cavity when said first and third locking members are engaged; and wherein said fourth locking member extends widthwise in a direction which is substantially parallel to said second wall of said second cavity when said second and fourth locking members are engaged.

19. The sealing nut of claim 18, wherein said first locking member includes a first tab which extends from said second wall of said first cavity; and wherein said second locking member includes a second tab which extends from said second wall of said second cavity.

20. The sealing nut of claim 19, wherein said third locking member includes a first finger sized and shaped to interlock with said first tab; and wherein said fourth locking member includes a second finger sized and shaped to interlock with said second tab.

21. The sealing nut of claim 15, wherein said third locking member includes a first finger sized and shaped to interlock with said first tab; and wherein said fourth locking member includes a second finger sized and shaped to interlock with said second tab.

22. The sealing nut of claim 1, wherein said base includes a first open trough at an end thereof adjacent said cover; and wherein said cover includes a second open trough therein, said first and second troughs cooperating to form another passageway communicating with said passageway of said base when said cover is in its said closed position.

23. The sealing nut of claim 22, wherein said another passageway has a longitudinal axis oriented at an angle relative to said longitudinal axis of said base; and wherein said first and second troughs capture a portion of the cable therebetween when said cover is in its said closed position for positioning same in said another passageway, whereby the cable is caused to form a bend adjacent a junction between said passageway and said another passageway.

24. The sealing nut of claim 23, wherein said first trough includes an arcuate surface formed in an end thereof adjacent said junction to thereby facilitate the bending of the cable when said cover is moved from its said open position to its said closed position.

25. The sealing nut of claim 24, wherein said angle is about 90 degrees.

26. The sealing nut of claim 1, further comprising a hinge pivotally connecting said cover to said base.

27. The sealing nut of claim 26, wherein said hinge includes a living hinge formed integrally with an end of said cover and an adjacent end of said base.

28. In combination, a liquid-tight connector mountable on a housing of an electrical or mechanical device and including a grasping portion adjacent an end thereof projecting outwardly from the housing; and a sealing nut including a base, which has a passageway extending therethrough along a longitudinal axis of said base and being sized and shaped so as to removably receive said grasping portion of said connector, a cover pivotally connected to said base such that said cover is movable between an open position, in which said cover exposes said passageway of said base to an extent sufficient to allow a cable to be fed through said sealing nut in a substantially straight line running generally parallel to said longitudinal axis of said base, and a closed position, in which said cover overlies said passageway in said base such that said cover loosely guides the cable to form a bend therein, retaining means for retaining said cover in its said closed position, and cooperating means for cooperating with said grasping portion of said connector so as to grasp an adjacent portion of the cable in a liquid-tight and strain-relieving manner, said cooperating means being located within said base, whereby the liquid-tight and strain-relieving functions performed thereby are not compromised during use even if said cover is inadvertently moved from its said closed position.

29. The combination of claim 28, wherein said retaining means includes at least one locking member formed on said base and at least another locking member formed on said cover, said at least another locking member engaging said at least one locking member when said cover is in its said closed position.

30. The combination of claim 29, wherein said at least one locking member includes at least one planar locking surface and said at least another locking member includes at least another planar locking surface, said at least one locking surface being in direct engagement with said another locking surface when said at least another locking member engages said at least one locking member, thereby retaining said cover in its said closed position.

31. The combination of claim 30, wherein said at least one locking surface lies in a plane which is substantially normal to said longitudinal axis of said base.

32. The combination of claim 31, wherein said at least another locking surface lies in said plane when said at least another locking member engages said at least one locking member, thereby enhancing resistance to the disengagement of said at least another locking member from said at least one locking member.

33. The combination of claim 32, wherein said at least one locking member includes a first locking member and a second locking member formed on said base; and wherein said at least another locking member includes a third locking member and a fourth locking member formed on said cover, said third locking member and said fourth locking member engaging said first locking member and said second locking member, respectively, when said cover is in its said closed position.

34. The combination of claim 33, wherein said first locking member and said second locking member include a first planar locking surface and a second planar locking surface, respectively; and wherein said third locking member and said fourth locking member include a third planar locking surface and a fourth planar locking surface, respectively, said first locking surface and said second locking surface being in direct engagement with said third locking surface and said fourth locking surface, respectively, when said third locking member and said fourth locking member engage said first locking member and said second locking member, respectively, thereby retaining said cover in its said closed position.

35. The combination of claim 34, wherein said first locking surface of said first locking member and said second locking surface of said second locking member lie in said plane; and wherein said third locking surface of said third locking member and said fourth locking surface of said fourth locking member lie in said plane when said third locking member and said fourth locking member engage said first locking member and said second locking member, respectively, thereby enhancing resistance to the disengagement of said third locking member and said fourth locking member from said first locking member and said second locking member, respectively.

36. The combination of claim 35, wherein said cover is pivotable about a pivot axis which extends substantially transverse to said longitudinal axis of said base.

37. The combination of claim 36, wherein said base is pivotally connected to said cover by a living hinge.

38. The combination of claim 37, wherein said base has a first cavity in one side thereof and a second cavity in an opposite side thereof, said first locking member and said second locking member being located in said first cavity and said second cavity, respectively; and wherein said third locking member depends from one side of said cover and said fourth locking member depends from an opposite side of said cover.

39. The combination of claim 38, wherein said first and second locking members engage said third and fourth locking members, respectively, in a snap-fit fashion.

40. The combination of claim 39, wherein each of said first and second cavities has a first planar wall which is substantially normal to said pivot axis and a second planar wall which is substantially parallel to said pivot axis.

41. The combination of claim 40, wherein said third locking member extends widthwise in a direction which is substantially parallel to said first wall of said first cavity when said first and third locking members are engaged; and wherein said fourth locking member widthwise extends in a direction which is substantially parallel to said first wall of said second cavity when said second and fourth locking members are engaged.

42. The combination of claim 41, wherein said first locking member includes a first tab which extends from said first wall of said first cavity; and wherein said second locking member includes a second tab which extends from said first wall of said second cavity.

43. The combination of claim 42, wherein said third locking member includes a first slot sized and shaped so as to receive said first tab when said cover is in its said closed position; and wherein said fourth locking member includes a second slot sized and shaped so as to receive said second tab when said cover is in its said closed position.

44. The combination of claim 43, wherein said first slot extends completely through an interior portion of said third locking member such that said third locking member surrounds said first tab when said cover is in its said closed position, whereby said first and third locking members will remain engaged even if said living hinge breaks; and wherein said second slot extends completely through an interior portion of said fourth locking member such that said fourth locking member surrounds said second tab when said cover is in its said closed position, whereby said second and fourth locking members will remain engaged even if said living hinge breaks.

45. The combination of claim 40, wherein said third locking member extends widthwise in a direction which is substantially parallel to said second wall of said first cavity when said first and third locking members are engaged; and wherein said fourth locking member extends widthwise in a direction which is substantially parallel to said second wall of said second cavity when said second and fourth locking members are engaged.

46. The combination of claim 45, wherein said first locking member includes a first tab which extends from said second wall of said first cavity; and wherein said second locking member includes a second tab which extends from said second wall of said second cavity.

47. The combination of claim 46, wherein said third locking member includes a first finger sized and shaped to interlock with said first tab; and wherein said fourth locking member includes a second finger sized and shaped to interlock with said second tab.

48. The combination of claim 42, wherein said third locking member includes a first finger sized and shaped to interlock with said first tab; and wherein said fourth locking member includes a second finger sized and shaped to interlock with said second tab.

49. The combination of claim 28, wherein said base includes a first open trough at an end thereof adjacent said cover; and wherein said cover includes a second open trough therein, said first and second troughs cooperating to form another passageway communicating with said passageway of said base when said cover is in its said closed position.

50. The combination of claim 49, wherein said another passageway has a longitudinal axis oriented at an angle relative to said longitudinal axis of said base; and wherein said first and second troughs capture a portion of the cable therebetween when said cover is in its said closed position for positioning same in said another passageway, whereby the cable is caused to form a bend adjacent a junction between said passageway and said another passageway.

51. The combination of claim 50, wherein said first trough includes an arcuate surface formed in an end thereof adjacent said junction to thereby facilitate the bending of the cable when said cover is moved from its said open position to its said closed position.

52. The combination of claim 51, wherein said angle is about 90 degrees.

53. The combination of claim 28, further comprising a hinge pivotally connecting said cover to said base.

54. The combination of claim 53, wherein said hinge includes a living hinge formed integrally with an end of said cover and an adjacent end of said base.

* * * * *